US008547794B2

(12) United States Patent
Gulati et al.

(10) Patent No.: US 8,547,794 B2
(45) Date of Patent: *Oct. 1, 2013

(54) EXTENDING THE COVERAGE OF VSP/CDP IMAGING BY USING FIRST-ORDER DOWNGOING MULTIPLES

(75) Inventors: Jitendra S. Gulati, Houston, TX (US); Xiaomin Zhao, Sugar Land, TX (US); Francis D. Doherty, Sugar Land, TX (US); Min Lou, Houston, TX (US)

(73) Assignee: Baker Hughes Incorporated, Houston, TX (US)

(*) Notice: Subject to any disclaimer, the term of this patent is extended or adjusted under 35 U.S.C. 154(b) by 679 days.

This patent is subject to a terminal disclaimer.

(21) Appl. No.: 12/756,430

(22) Filed: Apr. 8, 2010

(65) Prior Publication Data

US 2010/0271903 A1 Oct. 28, 2010

Related U.S. Application Data

(60) Provisional application No. 61/170,019, filed on Apr. 16, 2009.

(51) Int. Cl.
*G01V 1/00* (2006.01)
(52) U.S. Cl.
USPC .............................................. 367/73
(58) Field of Classification Search
USPC ....................... 367/50, 57; 702/14
See application file for complete search history.

(56) References Cited

U.S. PATENT DOCUMENTS

| 6,601,671 | B1 | 8/2003 | Zhao et al. | |
|---|---|---|---|---|
| 7,508,736 | B2* | 3/2009 | Lou et al. | 367/57 |
| 2007/0258324 | A1* | 11/2007 | Zhao et al. | 367/52 |
| 2008/0221796 | A1 | 9/2008 | Lou et al. | |

* cited by examiner

*Primary Examiner* — Krystine Breier
(74) *Attorney, Agent, or Firm* — Mossman Kumar & Tyler PC

(57) ABSTRACT

First-order free-surface multiples recorded in VSP data or reverse VSP data are processed using VSP/CDP method to produce an image of the subsurface. This image produces a larger coverage than that obtained in 3-C 3-D processing of reflection data acquired in the VSP.

20 Claims, 10 Drawing Sheets

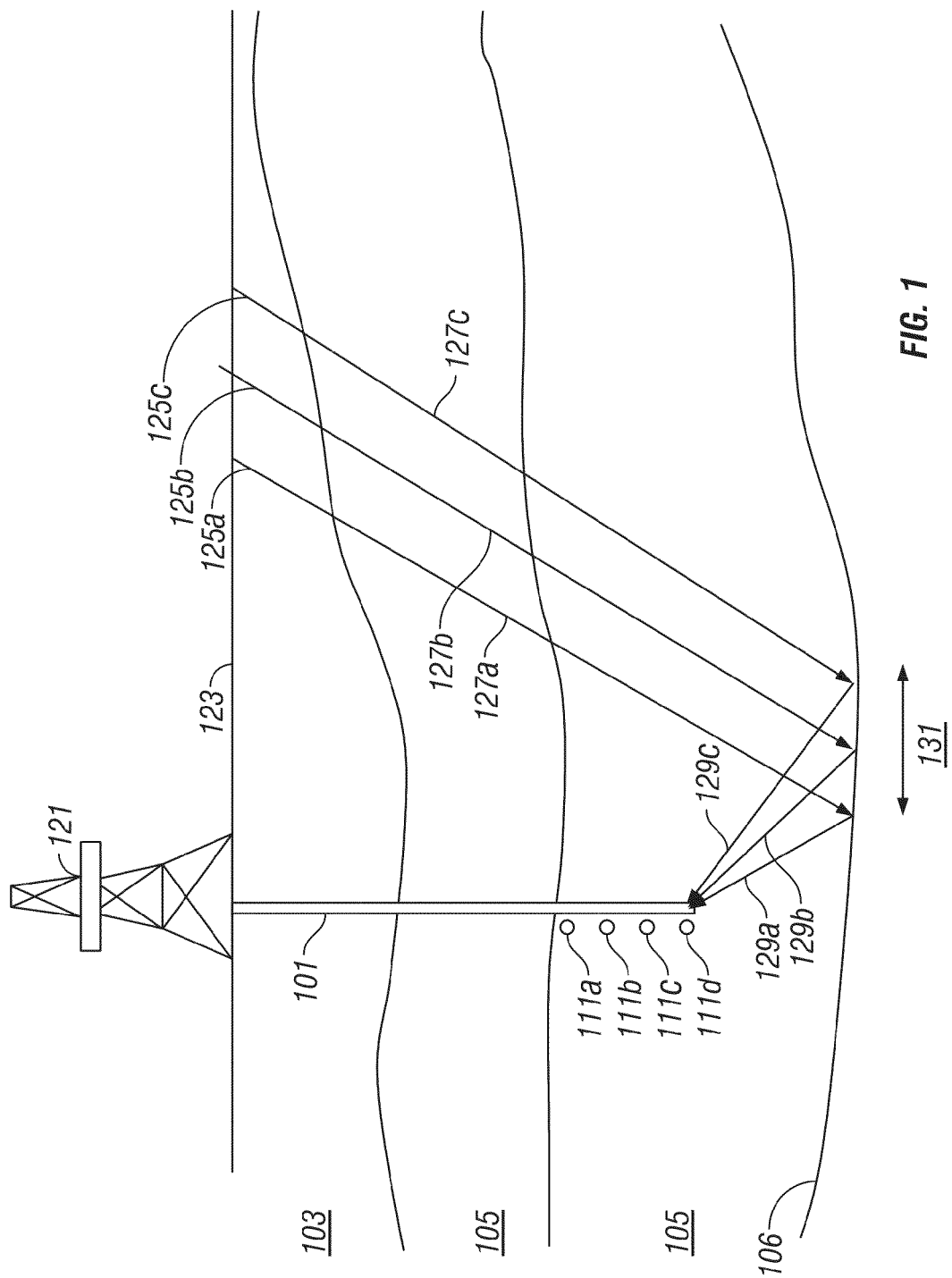

EXTENDING THE COVERAGE OF VSP/CDP IMAGING BY USING FIRST-ORDER DOWNGOING MULTIPLES

CROSS-REFERENCES TO RELATED APPLICATIONS

This application claims priority from U.S. Provisional Patent Application Ser. No. 61/170,019 filed on 16 Apr. 2009.

BACKGROUND OF THE DISCLOSURE

1. Field of the Disclosure

This disclosure relates to a method of geophysical prospecting which improves the subsurface area imaged by Vertical Seismic Profiling (VSP) data. Specifically, the disclosure uses surface multiples, which have previously been regarded as noise, to provide a migrated image of a larger portion of the subsurface.

2. Description of the Related Art

In surface seismic exploration, energy imparted into the earth by a seismic source reflects and scatters from subsurface geophysical features and is recorded by a multiplicity of surface positioned receivers. This process is repeated numerous times, using source and receiver configurations which may either form a line (2-D acquisition) or cover an area (3-D acquisition). The acquired data are processed to produce an image of the reflectors in the subsurface using a procedure known as migration. The produced image is then used in prospect evaluation and development. Prospect evaluation and development specifically includes using the determined geometry of subsurface traps to establish the volume of recoverable reserves, and the drilling of additional exploration, evaluation, and development wells based on the image.

Conventional reflection seismology utilizes surface sources and receivers to detect reflections from subsurface impedance contrasts. The obtained image often suffers in spatial accuracy, resolution, and coherence due to the long and complicated travel paths between source, reflector, and receiver.

In vertical seismic profiling, seismic signals are recorded using detectors in a wellbore to record the energy generated by the activation of seismic sources at the surface. This results in the geometry such as that shown in FIG. 1 and is discussed further below. It is well recognized that traditional migration of upgoing primary reflections produces a VSP data image of only a very narrow conical zone around a borehole with the cone tip centered at the shallowest receiver in a borehole. This is schematically illustrated in FIG. 1 wherein exemplary reflected 129a, 129b, and 129c are shown with an imaging zone denoted by 131.

The present disclosure is directed towards a method and system for increasing the coverage obtained in VSP data acquisition.

SUMMARY OF THE DISCLOSURE

In aspects, the present disclosure is related to methods and apparatuses for improving subsurface images using vertical seismic profiling/common depth point VSP/CDP data, particularly using surface multiples.

One embodiment of the present disclosure is a method of evaluating an earth formation. The method includes: receiving seismic data at least one receiver position responsive to an activation of a seismic source at least one source position, a first portion of the received seismic data resulting from a reflection of seismic waves at a free surface; and processing the received seismic data to generate a first image using the first portion of the received seismic data, wherein the processing of the received seismic data further comprises: building a mirror velocity model symmetric to the free surface using a subsurface velocity model, and projecting the at least one receiver positing to a virtual position on the mirror velocity model.

Another embodiment of the present disclosure is a system configured for evaluating an earth formation. The system includes: a seismic source configured to be activated at least one source position to generate seismic waves into the earth formation; a receiver at least one receiver position configured to receive seismic data, a first portion of the received seismic data resulting from a reflection of seismic waves at a free surface; and a processor configured to build a mirror velocity model symmetric to the free surface using a subsurface velocity model; project the at least one receiver position to a virtual position on the mirror velocity model; and process the first portion of the received seismic data using the mirror velocity model and the virtual position of the at least one receiver to produce a first image.

Examples of the more important features of the disclosure have been summarized rather broadly in order that the detailed description thereof that follows may be better understood and in order that the contributions they represent to the art may be appreciated.

BRIEF DESCRIPTION OF THE DRAWINGS

The present disclosure is best understood by reference to the attached figures in which like numerals refer to like elements, and in which:

FIG. 1 illustrates the geometry of data acquisition of a walkaway VSP according to the present disclosure;

DETAILED DESCRIPTION

Figure 2B:
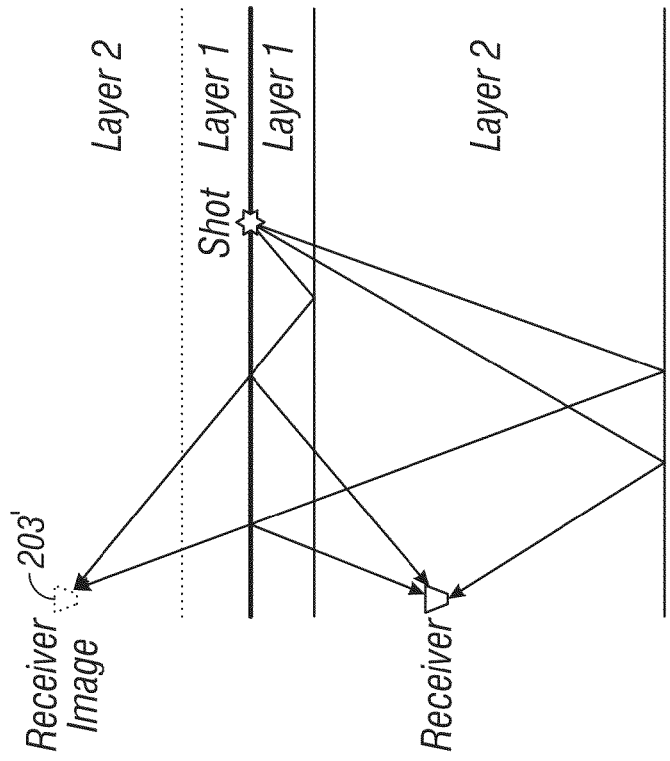
FIGS. 2A, 2B shows a primary reflection, first-order downgoing multiple, and an analogue using the method of virtual image.

For the present disclosure, the acquisition geometry of a walkaway VSP is illustrated in FIG. 1. Shown therein is the surface of the earth 123 with a rig 121 thereon. This may be a drilling rig or it may be a mast rig which conveys a wireline into a borehole 101. It could also be a borehole with permanently installed seismic sensors. The borehole 101 penetrates layers 103, 105 . . . . Positioned in the borehole 101 are seismic sensors denoted by 111a, 111b, 111c, 111d . . . . Each of the sensors may include a hydrophone, a single-component geophone or a multi-component geophone. Data for a single offset VSP is typically acquired using a single seismic source such as 125*a* at the surface (or within a body of water at the surface). An exemplary ray path which depicts the propagation of seismic energy from the source 125*a* to a detector 111*d* is depicted by the ray 127*a* that is reflected from the bottom of layer 105 at the boundary 106 and reaches the receiver 111*d* along the ray path denoted by 129*a*. Exemplary ray paths 127*b* and 127*c* depict the propagation of seismic energy from sources 125*b* and 125*c*, respectively. The seismic waves represented by the ray paths may be compressional waves and/or shear waves.

In a typical VSP, data resulting from operation of a source at a single position such as 125*a* are recorded in each of the receivers 111*a*, 111*b*, 111*c*, 111*d* . . . in the borehole. Analysis of the reflected data can provide information about the seismic velocities in the subsurface and the configuration of the layer boundaries. In a walkaway VSP, this process is repeated for operation of the source at a plurality of source positions such as 125*b*, 125*c* . . . . Acquisition of data from a plurality of source positions at a plurality of detectors provides a redundant sampling of the subsurface region. Commonly, a processor at a surface or at a remote location (not shown) is used to process the data. In offshore acquisition, and airgun is commonly used as a source. On land, explosive or vibratory sources may be used.

It is worth noting that with a VSP survey geometry shown in FIG. 1, the recorded signals may be responsive primarily to reflectors below the recording array, and over a limited portion of the subsurface indicated generally by 131.

Figure 2A:
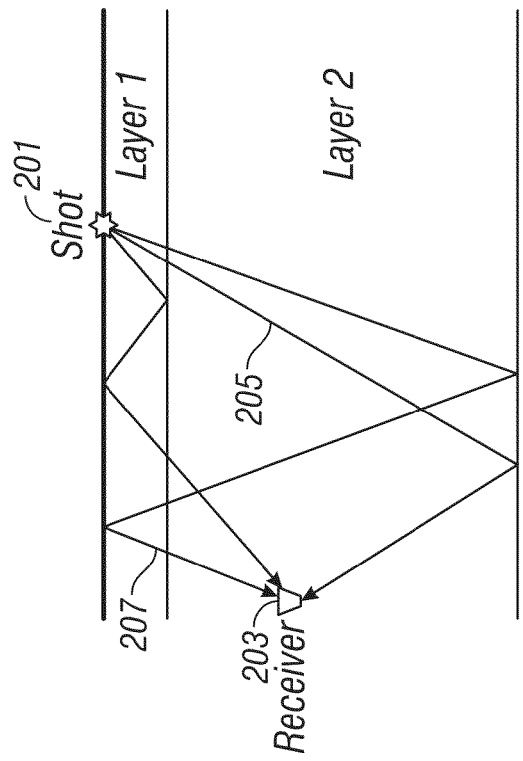

The present disclosure uses, in addition to the reflected signals from below the recording array, first-order free-surface related multiples. The first-order free-surface related multiples are actually those upgoing primary reflections reflected once again from the free surface, and then propagating in a downward direction to the borehole receivers. FIG. 2A illustrates the ray path corresponding to a seismic source 201, the upcoming primary reflection 205 and a downgoing first-order surface multiple 207 from the same reflecting interface as 205 to the receiver 203. The equivalent receiver image point is shown by 203' in FIG. 2B.

Figure 3:
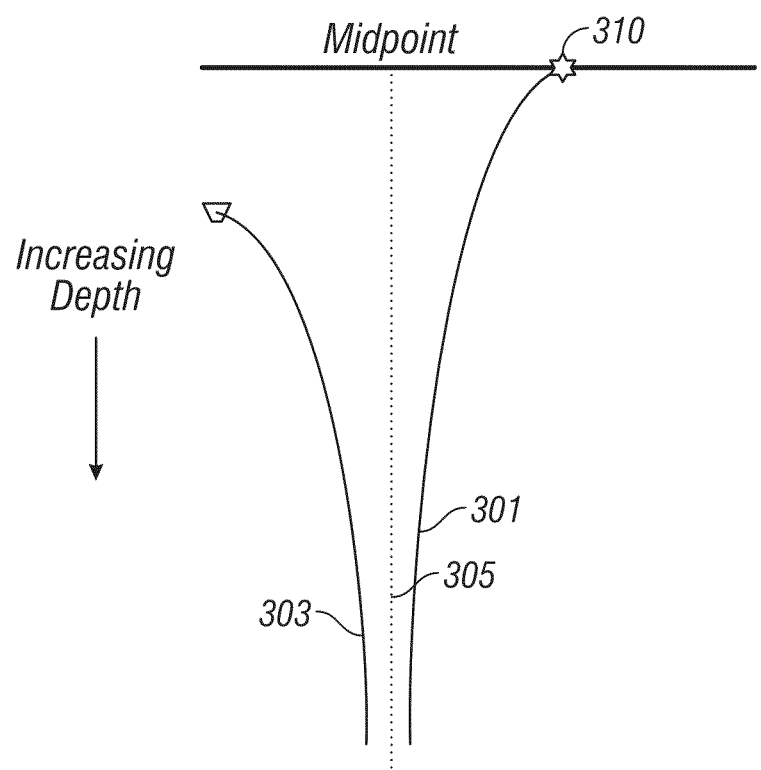
FIG. 3 shows the location of the midpoint reflection obtained for a single source position using VSP/CDP for a primary reflection and a first-order surface multiple for an exemplary model.
Figure 4B:
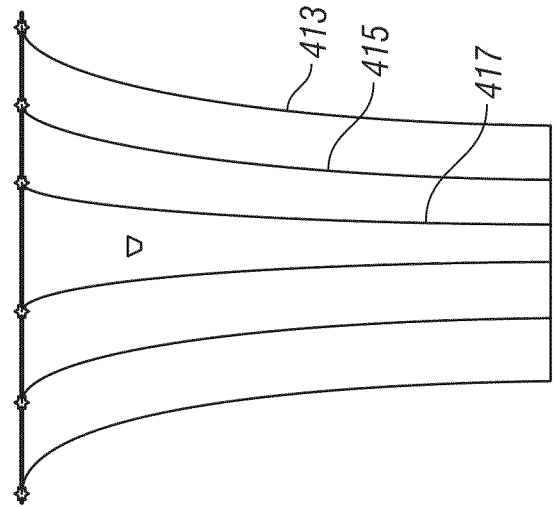
FIG. 4B shows the subsurface coverage obtained using VSP/CDP using first-order multiples.
Figure 4A:
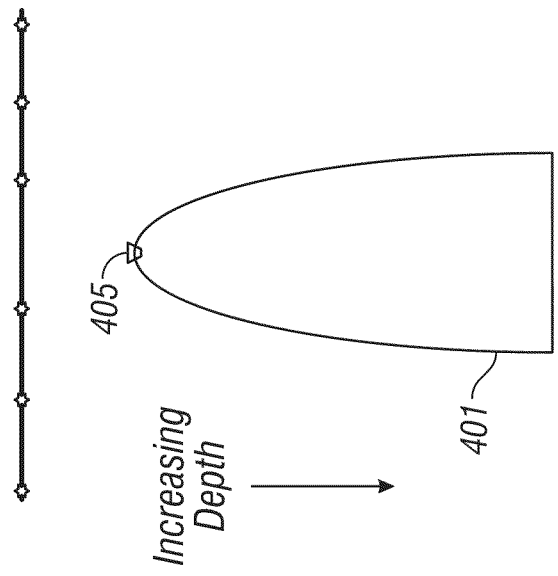
FIG. 4A shows the subsurface coverage obtained using VSP/CDP from primary reflections only.

FIG. 3 shows the subsurface coverage obtained from primary reflections 301 into a borehole 305 for an exemplary velocity model. For the first-order surface multiples (shown on the opposite side of the borehole for clarity) it can be seen that coverage 303 is obtained for a greater distance from the borehole. Specifically, what is plotted is the location of a reflection point for a layered earth formation at a plurality of depths corresponding to a single source location 310 on the surface. Using the same model, the insonification that is obtained is shown in FIG. 4A by 401 for primary reflections only. The insonification using first-order multiples is shown in FIG. 4B by 413, 415 and 417. It is worth noting that, using primaries only, it is not possible to image the subsurface above the depth of the top of the receiver array at 405. It should also be noted that the use of first-order multiples fills in a large portion of the subsurface outside the region bounded by 401 that is not imaged by the primary reflections.

Figure 5:
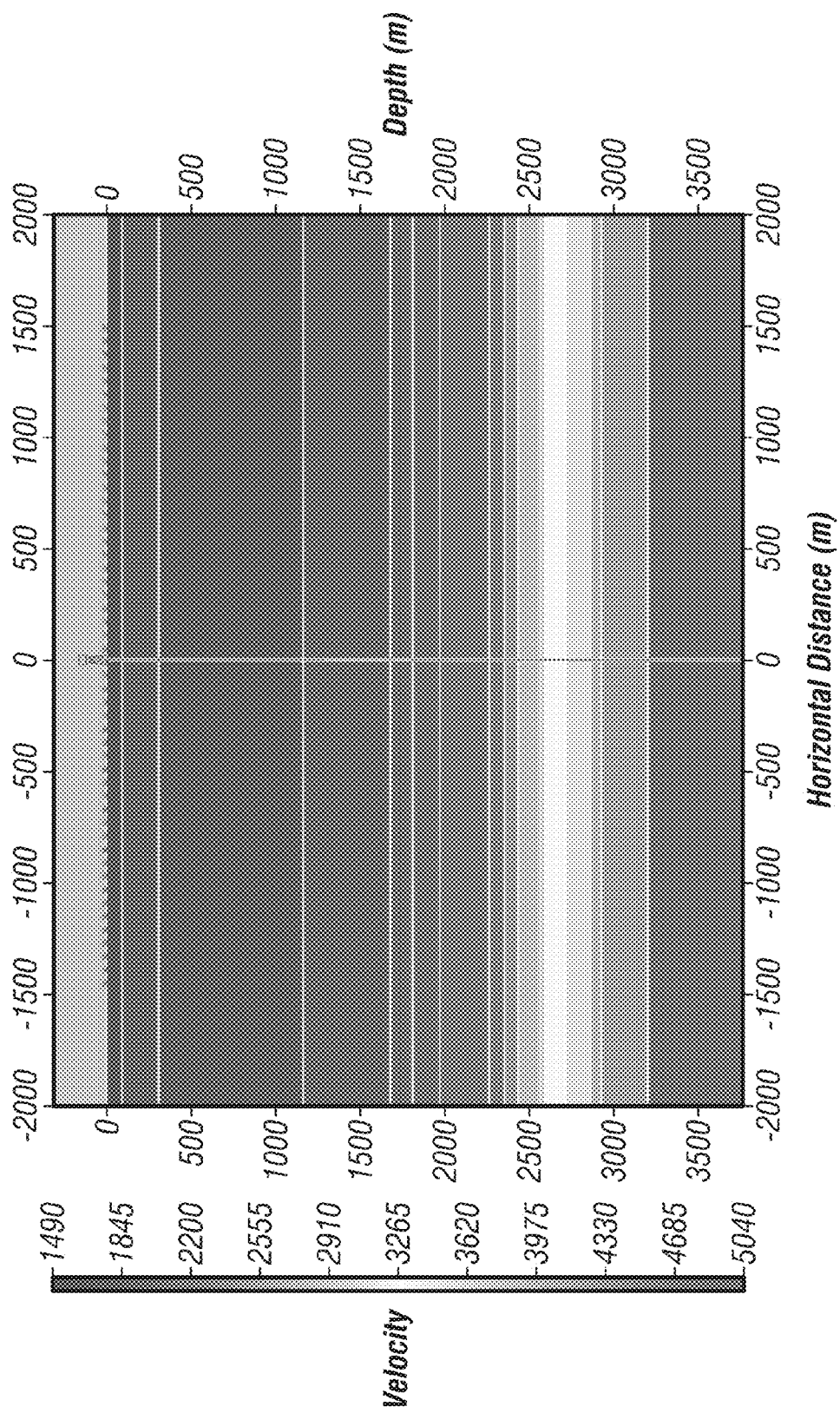
FIG. 5 shows the velocity model used for modeling results.
Figure 6A:
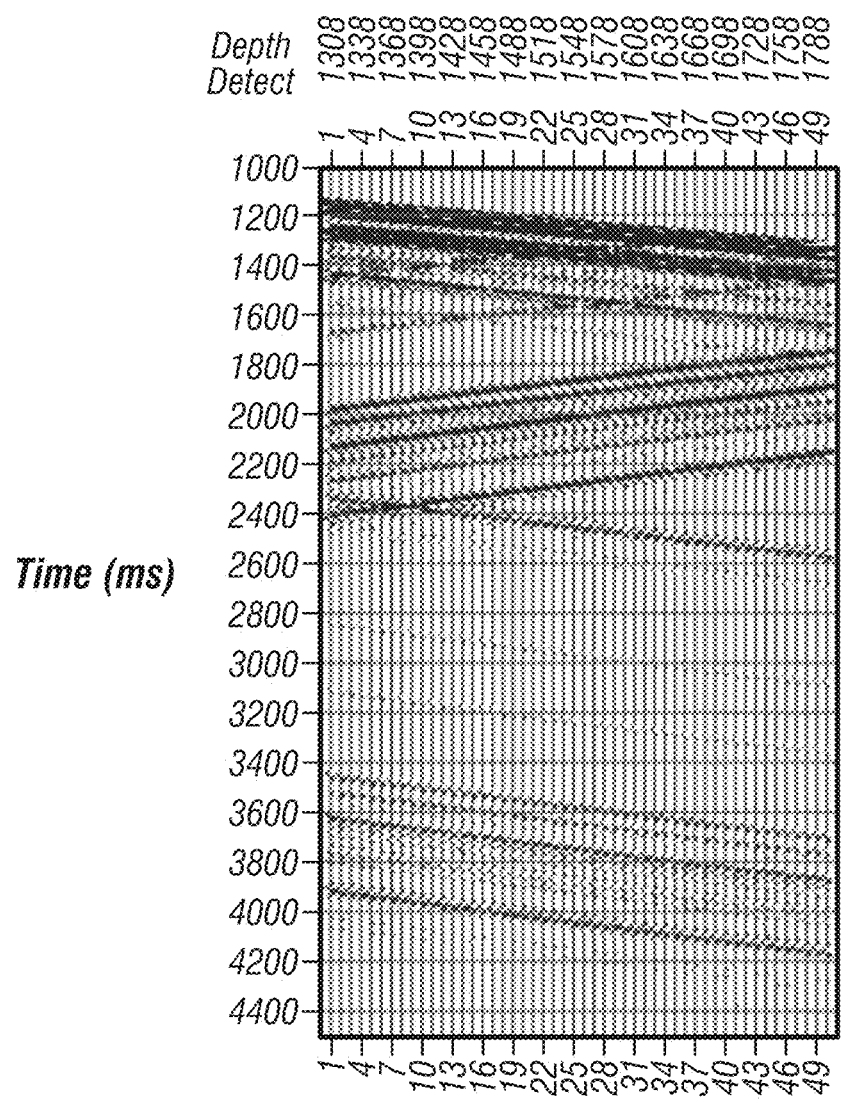
FIGS. 6A-C show shot gathers (a) with both upcoming and downgoing waves, (b) downgoing waves obtained by median filtering, and (c) upcoming waves obtained by median filtering.
Figure 6B:
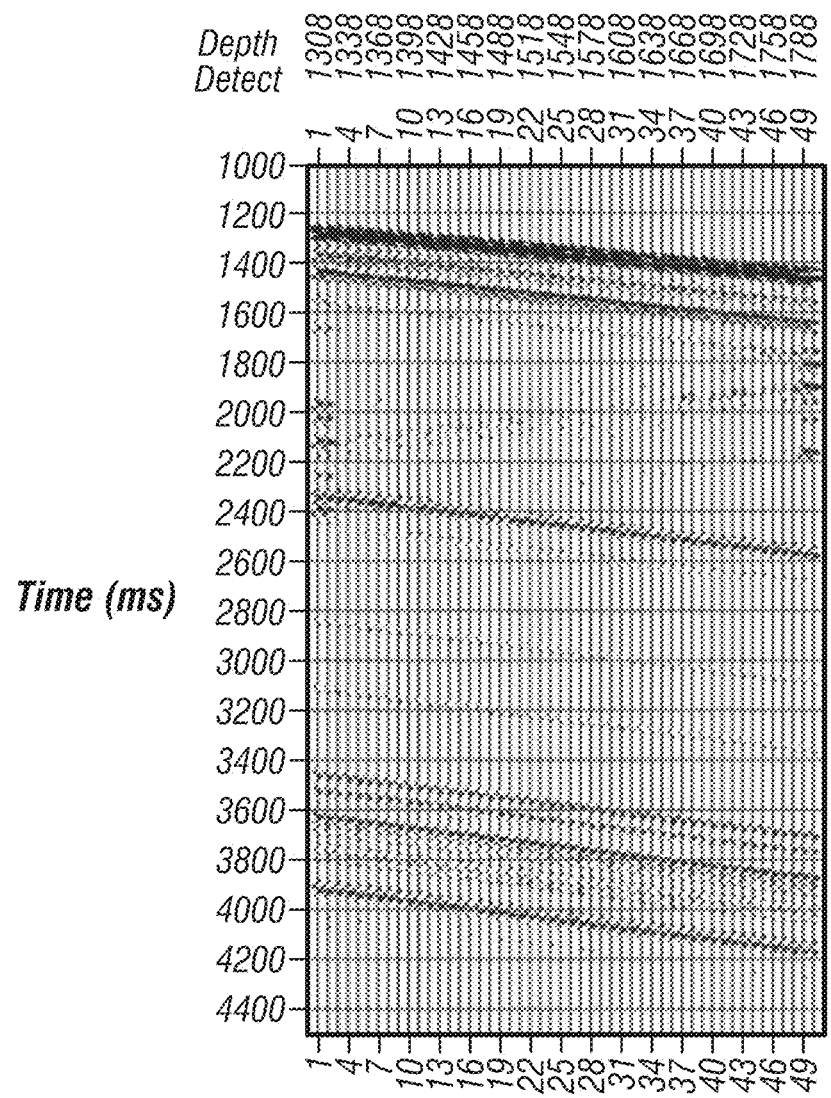
Figure 6C:
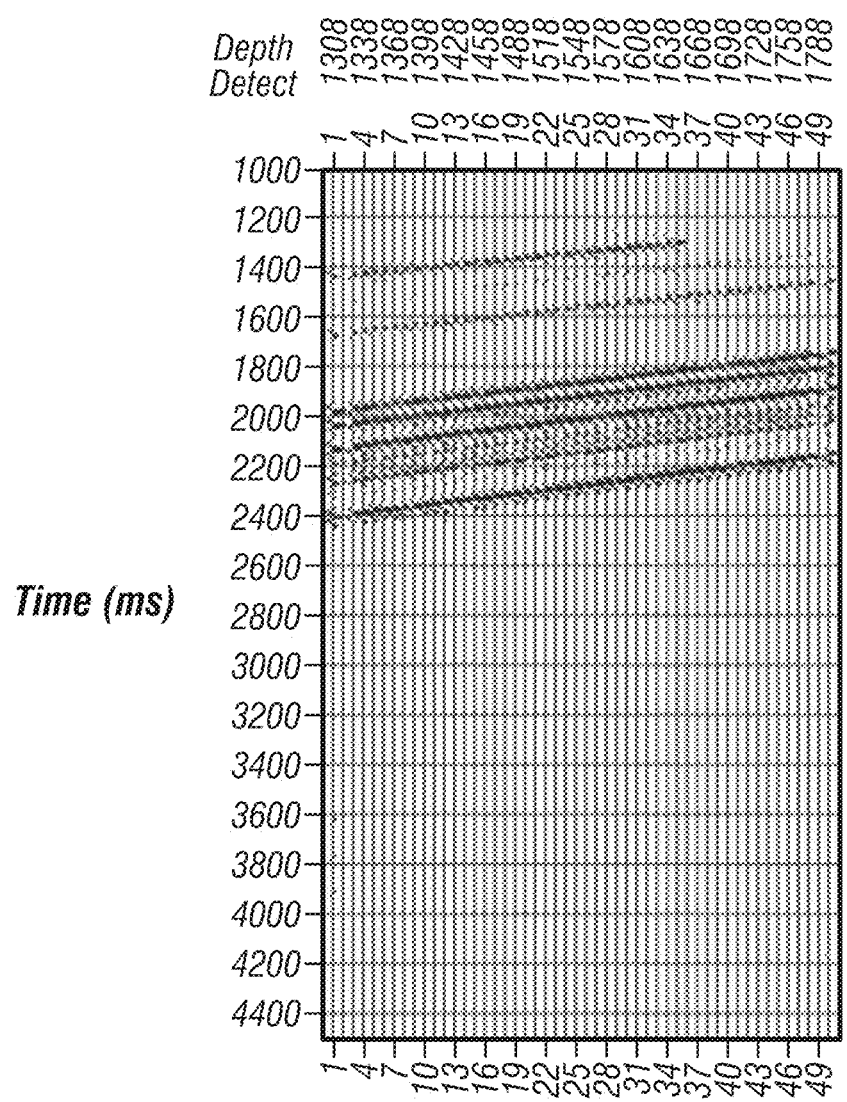

FIG. 5 shows a layered velocity model used for illustrating a method according to one embodiment of the present disclosure. FIG. 6A shows a synthetic shot gather with both upcoming and downgoing waves. The source offset is 1450*m*. FIG. 6B shows the same shot gather with downgoing waves obtained by median filtering. The direct arrivals have been muted for imaging purposes. FIG. 6C shows the same shot gather with upcoming waves obtained after median filtering.

Figure 7A:
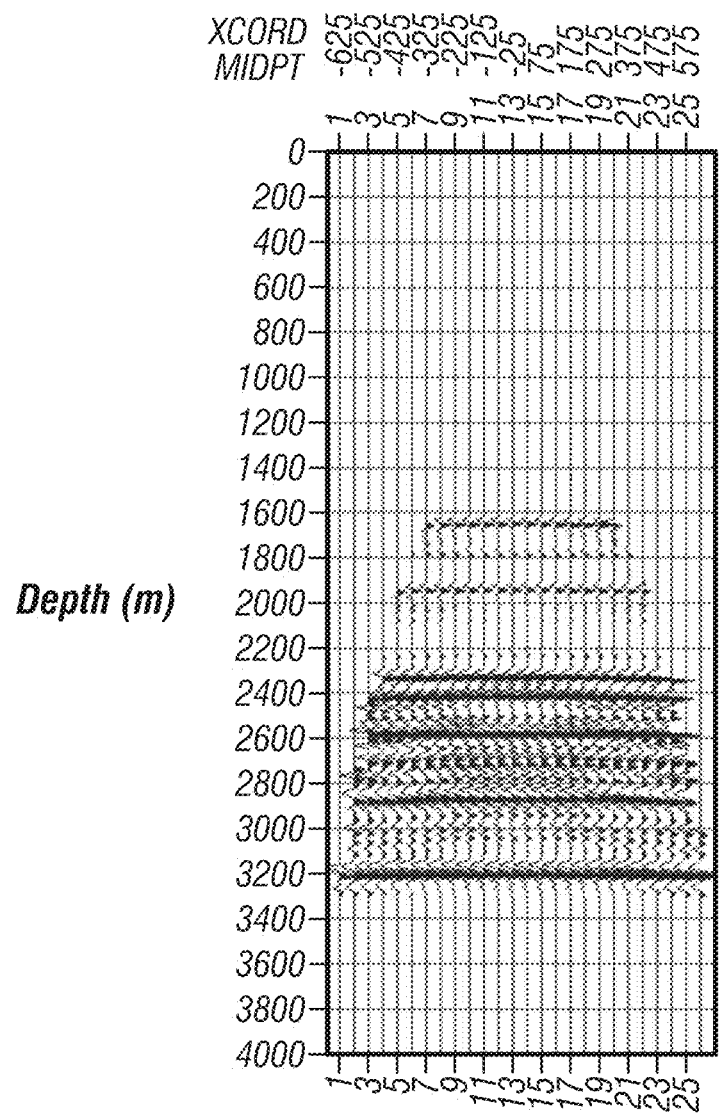
FIGS. 7A-B show results of VSP/CDP imaging of (a) upcoming primary reflections, and (b) downgoing first-order multiples.
Figure 7B:
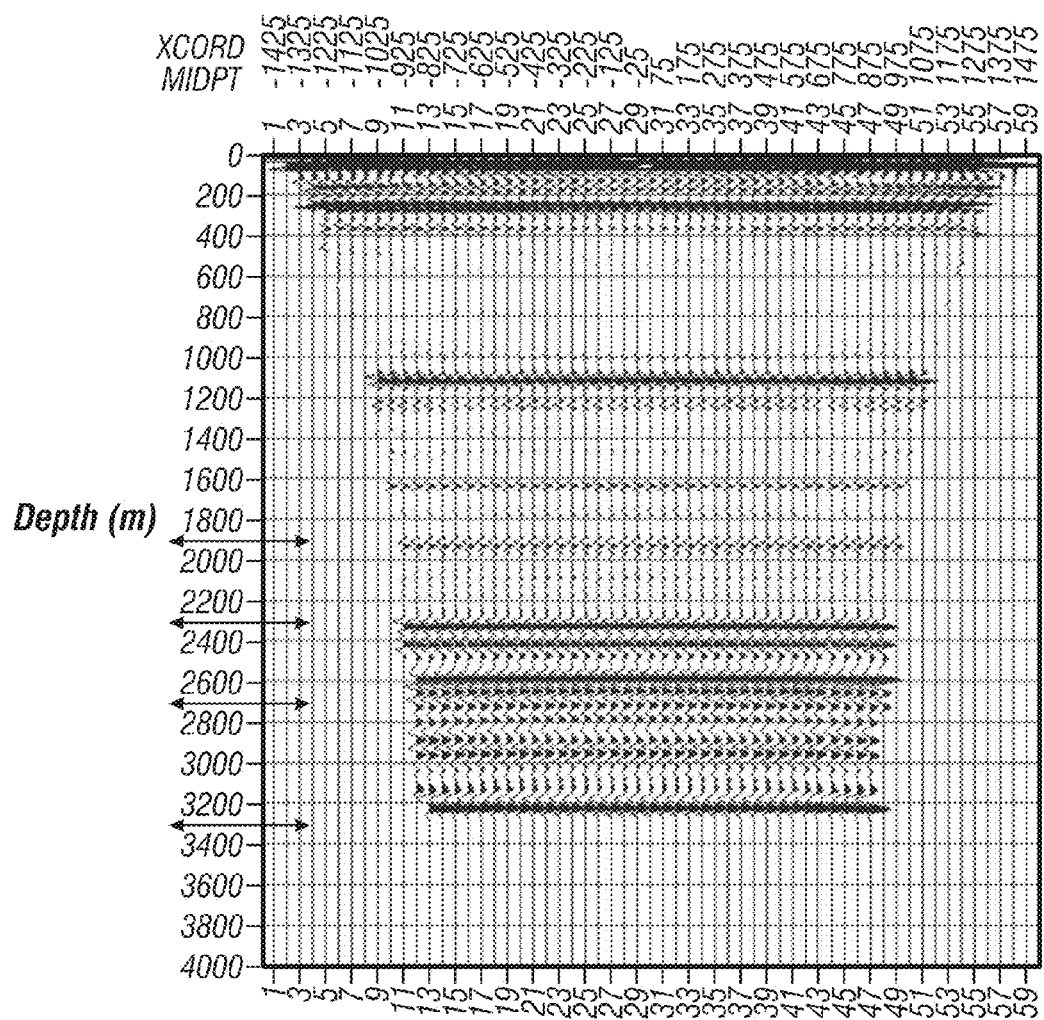

Turning now to FIG. 7, the results of imaging of the upcoming primary reflections are shown in FIG. 7A. The lack of coverage noted in FIG. 4A at shallow depths and at large offsets is confirmed. To produce a VSP/CDP image of the first-order downgoing multiples, a mirror image of the velocity model above the shot surface was created and the receiver locations were assigned at their mirror locations. The deconvolved upgoing and the downgoing waves were then used for VSP/CDP imaging the subsurface by using the same algorithm. The result of imaging the downgoing first-order primary reflections is shown in FIG. 7B. The additional coverage noted in FIG. 4B at shallow depths and large offsets is confirmed. In addition, there is a good match between the reflections events in the two sections at a number of different levels including those indicated by arrows.

The VSP/CDP process is a modification of the conventional surface CDP stacking process in which seismic events are summed along a hyperbola defined by:

$$T^2 = T_o^2 + \frac{x^2}{V_e^2}, \tag{1}$$

where x is the source-receiver offset, $T_0$ is the normal incidence traveltime to a reflector, T is the measured traveltime for the specified source-receiver offset, and $V_e$ is an effective (or root-mean-square) velocity.

For the VSP/CDP, the relation is given by:

$$\tau = \frac{T_g}{2} + \left(T^2 - \frac{X_s^2}{V^2}\right), \tag{2}$$

where $X_s$ is the source offset from the borehole, V is the velocity, $\tau$ is the two-way vertical time to a reflector, and $T_g$ is the two-way vertical time to a hypothetical reflector coincident with the receiver.

The method of the present disclosure has been described above in terms of VSP geometry in which sources are at the surface and a receiver may be at a downhole location. The method may also be practiced, based on the principle of reciprocity, by having a downhole seismic source and surface receivers. For such a reverse VSP geometry, the free surface reflection would occur before the reflection at the subsurface layer, and instead of a virtual receiver, the method would be based on constructing a virtual source.

The inversion and migration methodology described above may be implemented on a general purpose digital computer. As would be known to those versed in the art, instructions for the computer reside on a machine readable memory device such as ROMs, EPROMs, EAROMs, Flash Memories and Optical disks. These may be part of the computer or may be linked to the computer by suitable communication channels, and may be even at a remote location. Similarly, seismic data of the type discussed above may be stored on the computer or may be linked through suitable communication channels to the computer. The communication channels may include the Internet, enabling a user to access data from one remote location and get the instructions from another remote location to process the data. The instructions on the machine readable memory device enable the computer to access the multicomponent data and process the data according to the method described above.

What has been described above is a method of evaluating an earth formation. The method includes: activating a seismic source at least one source position and generating seismic waves into the earth formation; receiving seismic data at at least one receiver position, a first portion of the received seismic data resulting from a reflection of seismic waves at a free surface; processing the first portion of the received seismic data to produce a first image; and conducting further operations based at least in part on the produced first image; wherein processing the received seismic data further comprises: building a mirror velocity model symmetric to the free surface using a subsurface velocity model, and projecting the at least one receiver position to a virtual position on the mirror velocity model.

The seismic data may further include a reflection of seismic waves with a portion of the earth below the at least one receiver, and the method may include processing the received seismic data to produce a second image using the reflection of the seismic waves with the portion of the earth formation below the at least one receiver. The at least one source position may include a plurality of source positions at or near the free surface. The at least one receiver position may include a plurality of positions in a borehole in the earth formation. The processing of the received seismic data may include applying a VSP/CDP stacking. The further operations may include: storing at least one of the processed first image and second image on a suitable medium, displaying at least one of the processed first image and second image, performing additional prospect evaluation, establishing a volume of recoverable reserves, drilling an additional exploration well, drilling an additional evaluation well, and/or drilling in additional development well. The at least one source position may include a plurality of source positions in a borehole in the earth formation. The at least one receiver position may include a plurality of positions at or near the free surface.

Also described above is a system configured for evaluating an earth formation. The system includes: a seismic source configured to be activated at least one source position to generate seismic waves into the earth formation; a receiver at least one receiver position configured to receive seismic data, a first portion of the received seismic data resulting from a reflection of seismic waves at a free surface; and a processor configured to build a mirror velocity model symmetric to the free surface using a subsurface velocity model; project the at least one receiver position to a virtual position on the mirror velocity model; and process the first portion of the received seismic data using the mirror velocity model and the virtual position of the at least one receiver to produce a first image.

A portion of the seismic data may include a reflection of seismic waves with a portion of the earth formation below the at least one receiver and the processor may be configured to provide a second image of the earth formation using the reflection from below the at least one receiver. The at least one source position may include a plurality of source positions at or near the free surface. The at least one receiver position may include a plurality of positions in a borehole in the earth formation. The processor may be configured to process the received seismic data by further applying a VSP/CDP stacking. The further operations may include storing at least one of the processed first image and the processed second image on a suitable medium, displaying at least one of the processed first image and second image, performing additional prospect evaluation, establishing a volume of recoverable reserves, drilling an additional exploration well, drilling an additional evaluation well, and/or drilling in additional development well. The source may be an airgun, an explosive source, or a vibratory source. The system may include a conveyance device configured to convey the receiver into a borehole. The at least one source position may include a plurality of source positions in a borehole in the earth formation. The at least one receiver position may include a plurality of positions at or near the free surface.

While the foregoing disclosure is directed to the preferred embodiments of the disclosure, various modifications will be apparent to those skilled in the art. It is intended that all such variations within the scope and spirit of the appended claims be embraced by the foregoing disclosure.

We claim:

1. A method of evaluating an earth formation, the method comprising:
   receiving seismic data at at least one receiver position responsive to an activation of a seismic source at at least one source position, a first portion of the received seismic data resulting from a reflection of seismic waves at a free surface; and
   processing the received seismic data to generate a first image using the first portion of the received seismic data, wherein the processing of the received seismic data further comprises:
   building a mirror velocity model symmetric to the free surface using a subsurface velocity model, and
   projecting the at least one receiver positing to a virtual position on the mirror velocity model.

2. The method of claim 1, further comprising:
   conducting further operations based at least in part on the first image.

3. The method of claim 1, further comprising:
   activating a seismic source at at least one source position and generating the seismic waves into the earth formation.

4. The method of claim 1, further comprising:
   using, for the received seismic data, received seismic data that includes a reflection of seismic waves with a portion of the earth below the at least one receiver; and
   processing the received seismic data to produce a second image using the reflection of the seismic waves with the portion of the earth formation below the at least one receiver.

5. The method of claim 1 further comprising using, for the at least one source position, at least one source position that includes a plurality of source positions at or near the free surface.

6. The method of claim 1 further comprising using, for the at least one receiver position, at least one receiver position that includes a plurality of positions in a borehole in the earth formation.

7. The method of claim 1, wherein the processing of the received seismic data further comprises applying a VSP/CDP stacking.

8. The method of claim 2 wherein the further operations include at least one of:
   (i) storing at least one of the processed first image and second image on a suitable medium,
   (ii) displaying at least one of the processed first image and second image,
   (iii) performing additional prospect evaluation,
   (iv) establishing a volume of recoverable reserves,
   (v) drilling an additional exploration well,
   (vi) drilling an additional evaluation well, and
   (vii) drilling in additional development well.

9. The method of claim 1 further comprising using, for the at least one source position, at least one source position that includes a plurality of source positions in a borehole in the earth formation.

10. The method of claim 1 further comprising using, for the at least one receiver position, at least one receiver position that includes a plurality of positions at or near the free surface.

11. A system configured for evaluating an earth formation, the system comprising:
- a seismic source configured to be activated at at least one source position to generate seismic waves into the earth formation;
- a receiver at at least one receiver position configured to receive seismic data, a first portion of the received seismic data resulting from a reflection of seismic waves at a free surface; and
- a processor configured to:
  - build a mirror velocity model symmetric to the free surface using a subsurface velocity model;
  - project the at least one receiver position to a virtual position on the mirror velocity model; and
  - process the first portion of the received seismic data using the mirror velocity model and the virtual position of the at least one receiver to produce a first image.

12. The system of claim 11 wherein a portion of the received seismic data comprises a reflection of seismic waves with a portion of the earth formation below the at least one receiver and wherein the processor is further configured to provide a second image of the earth formation using the reflection from below the at least one receiver.

13. The system of claim 11 wherein the at least one source position further comprises a plurality of source positions at or near the free surface.

14. The system of claim 11 wherein the at least one receiver position further comprises a plurality of positions in a borehole in the earth formation.

15. The system of claim 11 wherein the processor is further configured to process the received seismic data by further applying a VSP/CDP stacking.

16. The system of claim 11 wherein the processor is configured to conduct further operations based at least in part on the first image, the further operations including at least one of:
  - (i) storing at least one of the processed first image and the processed second image on a suitable medium,
  - (ii) displaying at least one of the processed first image and second image,
  - (iii) performing additional prospect evaluation,
  - (iv) establishing a volume of recoverable reserves,
  - (v) drilling an additional exploration well,
  - (vi) drilling an additional evaluation well, and
  - (vii) drilling in additional development well.

17. The system of claim 11 wherein the source is selected from the group consisting of: (i) an airgun, (ii) an explosive source, and (iii) a vibratory source.

18. The system of claim 11 further comprising a conveyance device configured to convey the receiver into a borehole.

19. The system of claim 11 wherein the at least one source position further comprises a plurality of source positions in a borehole in the earth formation.

20. The system of claim 11 wherein the at least one receiver position further comprises a plurality of positions at or near the free surface.

* * * * *